(12) United States Patent  
Zhang et al.

(10) Patent No.: US 12,316,230 B2  
(45) Date of Patent: May 27, 2025

(54) TWO-TRANSISTOR FLYBACK CONVERSION CIRCUIT, POWER MODULE, ELECTRIC VEHICLE, AND CONTROL METHOD

(71) Applicant: Huawei Digital Power Technologies Co., Ltd., Shenzhen (CN)

(72) Inventors: Xue Zhang, Dongguan (CN); Jie Ren, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 315 days.

(21) Appl. No.: 18/160,455

(22) Filed: Jan. 27, 2023

(65) Prior Publication Data

US 2023/0170809 A1 Jun. 1, 2023

Related U.S. Application Data

(63) Continuation of application No. PCT/CN2021/104008, filed on Jul. 1, 2021.

(30) Foreign Application Priority Data

Jul. 30, 2020 (CN) .......................... 202010750026.3

(51) Int. Cl.
  *H02M 3/335* (2006.01)
  *H02M 1/00* (2006.01)

(52) U.S. Cl.
  CPC ..... *H02M 3/33569* (2013.01); *H02M 1/0058* (2021.05)

(58) Field of Classification Search
  CPC .......... H02M 3/33569; H02M 1/0058; H02M 1/0048; H02M 1/08; H02M 1/32
  See application file for complete search history.

(56) References Cited

U.S. PATENT DOCUMENTS

| 4,016,475 A * | 4/1977 | Makino | H02M 3/3384 363/22 |
| 6,191,960 B1 * | 2/2001 | Fraidlin | H02M 3/33576 363/90 |
| 6,349,044 B1 * | 2/2002 | Canales-Abarca | H02M 1/34 363/56.08 |
| 8,901,839 B2 * | 12/2014 | Luccato | H02M 3/335 363/133 |
| 9,742,264 B2 | 8/2017 | O'Day | |

(Continued)

FOREIGN PATENT DOCUMENTS

| CN | 101860189 B | 5/2013 |
| CN | 203840205 U | 9/2014 |
| CN | 104237615 A | 12/2014 |

(Continued)

*Primary Examiner* — Kyle J Moody
(74) *Attorney, Agent, or Firm* — Conley Rose, P.C.

(57) ABSTRACT

A control method of a two-transistor flyback converter including an auxiliary circuit, where before charging of a primary-side winding starts, the control method may include the auxiliary circuit may increasing a potential at a first end of the primary-side winding, and decreasing a potential at a second end of the primary-side winding. By adding the auxiliary circuit, soft switching can be implemented for switching transistors at both ends of the primary-side winding.

20 Claims, 6 Drawing Sheets

(56) References Cited

U.S. PATENT DOCUMENTS

| | | |
|---|---|---|
| 9,899,909 B2 | 2/2018 | Lin et al. |
| 2014/0097701 A1* | 4/2014 | Bailey ................. H03K 17/102 |
| | | 307/113 |

FOREIGN PATENT DOCUMENTS

| | | |
|---|---|---|
| CN | 105305848 A | 2/2016 |
| CN | 107769575 A | 3/2018 |
| CN | 207410226 U | 5/2018 |
| KR | 20100023303 A | 3/2010 |

* cited by examiner

TWO-TRANSISTOR FLYBACK CONVERSION CIRCUIT, POWER MODULE, ELECTRIC VEHICLE, AND CONTROL METHOD

CROSS-REFERENCE TO RELATED APPLICATIONS

This is a continuation of International Patent Application No. PCT/CN2021/104008 filed on Jul. 1, 2021, which claims priority to Chinese Patent Application No. 202010750026.3 filed on Jul. 30, 2020. The disclosures of the aforementioned applications are hereby incorporated by reference in their entireties.

TECHNICAL FIELD

This application relates to the field of converter technologies, and in particular, to a two-transistor flyback conversion circuit, a power module, an electric vehicle, and a control method.

BACKGROUND

A two-transistor flyback converter is a common direct current to direct current (DC/DC) converter, and has advantages such as high conversion efficiency, a simple structure, and a relatively low voltage withstand requirement for a power switching transistor, and therefore is widely used in a high-voltage input scenario.

A primary-side circuit of the two-transistor flyback converter includes a switching transistor Q1, a switching transistor Q2, and a primary-side winding. A source of the switching transistor Q1 is configured to receive an input voltage, a drain of the switching transistor Q1 is connected to one end of the primary-side winding, and a source of the switching transistor Q2 is connected to the other end of the primary-side winding. During operating of the two-transistor flyback converter, switching-on and switching-off of the switching transistor Q1 and the switching transistor Q2 are controlled to control charging and discharging of the primary-side winding, so that the primary-side winding can cooperate with a secondary-side circuit of the two-transistor flyback converter to complete voltage conversion. Because the primary-side circuit has two switching transistors (the switching transistor Q1 and the switching transistor Q2), a source-drain voltage of a single switching transistor can be reduced during discharging of the primary-side winding, thereby reducing a voltage withstand requirement for the single switching transistor.

However, in the current two-transistor flyback converter, only hard switching can be implemented for the switching transistor Q1 and the switching transistor Q2. As a result, specific energy loss occurs when the switching transistor Q1 and the switching transistor Q2 are switched on. Especially during operating at a high frequency, conversion efficiency of the two-transistor flyback converter is seriously limited because the switching transistor Q1 and the switching transistor Q2 are switched on more times in a unit time. Therefore, the current two-transistor flyback converter needs further researches.

SUMMARY

In view of this, this application provides a two-transistor flyback conversion circuit, a power module, an electric vehicle, and a control method, to help improve conversion efficiency of a power module while reducing a requirement of the power module on voltage withstand performance of a power switching transistor.

According to a first aspect, an embodiment of this application provides a two-transistor flyback conversion circuit. The two-transistor flyback conversion circuit mainly includes a primary-side circuit, a secondary-side circuit, and an auxiliary circuit. The primary-side circuit includes a primary-side winding, the secondary-side circuit includes a secondary-side winding, the auxiliary circuit includes an auxiliary winding, and the primary-side winding, the secondary-side winding, and the auxiliary winding are coupled to each other. Before the primary-side circuit charges the primary-side winding, the auxiliary circuit may charge the auxiliary winding, so that the auxiliary winding stores electric energy. After stopping charging the auxiliary winding, the auxiliary circuit may further discharge to the primary-side winding through the auxiliary winding, so that a potential at a first end of the primary-side winding may increase, and a potential at a second end of the primary-side winding may decrease. During charging of the auxiliary winding, the potential at the second end of the primary-side winding is higher than the potential at the first end of the primary-side winding.

According to an operating principle of the two-transistor flyback conversion circuit, the primary-side circuit of the two-transistor flyback conversion circuit includes two power switching transistors (a first switching transistor and a second switching transistor), where a first electrode of the first switching transistor may receive an input voltage, a second electrode of the first switching transistor is connected to the first end of the primary-side winding, a first electrode of the second switching transistor is connected to the second end of the primary-side winding, and a second electrode of the second switching transistor may be connected to a zero-potential point. When the two power switching transistors are switched off, the first end of the primary-side winding is a low-potential end. In various embodiments, the first electrode of the first switching transistor has a high potential, and the second electrode has a low potential. Similarly, the second end of the primary-side winding is a high-potential end. In other embodiments, the first electrode of the second switching transistor has a low potential, and the second electrode of the second switching transistor has a high potential. Therefore, there is a relatively high voltage between the first electrode and the second electrode of the first switching transistor and between the first electrode and the second electrode of the second switching transistor.

In this embodiment of this application, because the auxiliary winding is coupled to the primary-side winding, the auxiliary winding may discharge to the primary-side winding after the auxiliary circuit stops charging the auxiliary winding. The auxiliary winding discharges to the primary-side winding so that the potential at the first end of the primary-side winding increases. The potential at the first end of the primary-side winding is equivalent to a potential at the second electrode of the first switching transistor. In addition, a potential at the first electrode of the first switching transistor is a stable high potential. Therefore, with the increase of the potential at the first end of the primary-side winding, the voltage between the first electrode and the second electrode of the first switching transistor can be reduced, thereby helping implement soft switching of the first switching transistor.

Similarly, the auxiliary winding discharges to the primary-side winding so that the potential at the second end of the primary-side winding decreases. The potential at the second end of the primary-side winding is equivalent to a potential at the first electrode of the second switching transistor. In addition, the second electrode of the second switching transistor is connected to the zero-potential point. Therefore, with the decrease of the potential at the second end of the primary-side winding, the voltage between the first electrode and the second electrode of the second switching transistor can be reduced, thereby helping implement soft switching of the second switching transistor.

It can be understood that, to enable the first switching transistor and the second switching transistor to achieve a desired soft switching effect, the auxiliary circuit may further discharge to the primary-side winding through the auxiliary winding, so that the potential at the first end of the primary-side winding increases to the potential at the first electrode of the first switching transistor, and the potential at the second end of the primary-side winding decreases to the potential at the second electrode of the second switching transistor. In this case, the voltage between the first electrode and the second electrode in the first switching transistor and the voltage between the first electrode and the second electrode in the second switching transistor are both 0, so that the desired soft switching effect can be achieved.

To sum up, in the two-transistor flyback circuit provided in this embodiment of this application, the auxiliary circuit may reduce the voltage between the first electrode and the second electrode in the first switching transistor and the voltage between the first electrode and the second electrode in the second switching transistor, thereby helping implement soft switching of the first switching transistor and the second switching transistor. Further, this helps reduce loss of the two-transistor flyback conversion circuit and improve conversion efficiency of the two-transistor flyback conversion circuit.

For example, the auxiliary circuit may include the auxiliary winding, an auxiliary capacitor, and an auxiliary switching transistor, where one end of the auxiliary capacitor is connected to a first end of the auxiliary winding, the other end of the auxiliary capacitor is connected to a second electrode of the auxiliary switching transistor, and a first electrode of the auxiliary switching transistor is connected to a second end of the auxiliary winding. After being switched on, the auxiliary switching transistor may enable the auxiliary winding to be charged. After being switched off, the auxiliary switching transistor may enable the auxiliary winding to stop being charged and discharge to the primary-side winding. The auxiliary capacitor may charge the auxiliary winding after the auxiliary switching transistor is switched on, and stop charging the auxiliary winding after the auxiliary switching transistor is switched off.

In the auxiliary circuit, electric energy stored in the auxiliary capacitor may come from the primary-side winding. Further, when the primary-side winding discharges, the auxiliary winding may further receive electric energy released by the primary-side winding; and when the primary-side winding discharges, the auxiliary capacitor may further store the electric energy received by the auxiliary winding.

In a possible implementation, the auxiliary switching transistor may include a body diode, an anode of the body diode is connected to the other end of the auxiliary capacitor, and a cathode of the body diode is connected to the second end of the auxiliary winding. In this way, the body diode can remain cut off when the primary-side winding is charged, and the body diode can be switched on when the primary-side winding discharges.

As described above, the two-transistor flyback conversion circuit includes the primary-side circuit and the secondary-side circuit. For example, the primary-side circuit may include the primary-side winding, a first switching transistor, a second switching transistor, a first diode, a second diode, and an input capacitor. A first electrode of the first switching transistor is connected to one end of the input capacitor and a cathode of the first diode, the first electrode of the first switching transistor is configured to receive an input voltage, a second electrode of the first switching transistor is connected to a cathode of the second diode and the first end of the primary-side winding, the second end of the primary-side winding is connected to an anode of the first diode and a first electrode of the second switching transistor, a second electrode of the second switching transistor is connected to an anode of the second diode, and the second electrode of the second switching transistor is equipotentially connected to the other end of the input capacitor.

Both the first switching transistor and the second switching transistor may be switched on when the primary-side winding is charged, and switched off when the primary-side winding discharges.

The primary-side winding may be charged by using the input voltage when the first switching transistor and the second switching transistor are switched on, and discharge to the auxiliary winding and the secondary-side winding when the first switching transistor and the second switching transistor are switched off. Both the first diode and the second diode may be cut off when the primary-side winding is charged, and switched on when the primary-side winding discharges. The input capacitor may store leakage inductance energy in the primary-side winding when the primary-side winding discharges.

In this embodiment of this application, the input capacitor in the primary-side circuit may recover the leakage inductance energy in the primary-side winding, thereby helping reduce loss of the two-transistor flyback conversion circuit and improve conversion efficiency of the two-transistor flyback conversion circuit.

For example, the secondary-side circuit may include the secondary-side winding, an output capacitor, and a secondary-side diode. A first end of the secondary-side winding is connected to one end of the output capacitor, the first end of the secondary-side winding is configured to output an output voltage, a second end of the secondary-side winding is connected to a cathode of the secondary-side diode, an anode of the secondary-side diode is connected to the other end of the output capacitor, and the other end of the output capacitor is grounded. When the primary-side winding discharges, the secondary-side winding may receive electric energy released by the primary-side winding. The secondary-side diode may be cut off when the primary-side winding is charged, and switched on when the primary-side winding discharges. The output capacitor may filter the output voltage, so that the secondary-side circuit can output a stable output voltage.

According to a second aspect, an embodiment of this application further provides a power module. The power module may include the two-transistor flyback conversion circuit provided in any one of the implementations of the first aspect, and a control circuit. The power module may be a direct current—direct current power module or an alternating current—direct current power module (an inverter). The power module may be applied to different types of electronic devices, for example, an electric vehicle, a data center, and a transformer box. For a technical effect of a corresponding solution in the second aspect, refer to a technical effect that can be achieved in a corresponding solution in the first aspect. Repeated content is not described in detail again.

For example, the two-transistor flyback conversion circuit includes a primary-side circuit, a secondary-side circuit, and an auxiliary circuit, the primary-side circuit includes a primary-side winding, the secondary-side circuit includes a secondary-side winding, the auxiliary circuit includes an auxiliary winding, and the primary-side winding, the secondary-side winding, and the auxiliary winding are coupled to each other. Before controlling the primary-side circuit to charge the primary-side winding, the control circuit may control the auxiliary circuit to charge the auxiliary winding, so that the auxiliary winding stores electric energy. The control circuit controls the auxiliary circuit to stop charging the auxiliary winding, and enables the auxiliary circuit to release, through the auxiliary winding, the stored electric energy to the primary-side winding, so that a potential at a first end of the primary-side winding increases, and a potential at a second end of the primary-side winding decreases. During charging of the auxiliary winding, the potential at the second end of the primary-side winding is higher than the potential at the first end of the primary-side winding.

First duration in which the auxiliary circuit is controlled to charge the auxiliary winding is positively related to an input voltage and an output voltage of the two-transistor flyback conversion circuit. In a possible implementation, the control circuit may further determine the first duration based on the input voltage and the output voltage of the two-transistor flyback conversion circuit. With this implementation, the control circuit may dynamically adjust a length of the first duration based on the input voltage and the output voltage. Therefore, the control circuit can flexibly adapt to changes of the input voltage and the output voltage, so that soft switching can be implemented for a first switching transistor and a second switching transistor in different application scenarios.

In another possible implementation, the first duration in which the auxiliary circuit is controlled to charge the auxiliary winding may be alternatively a specified time length. Further, with respect to only one two-transistor flyback conversion circuit, an input voltage and an output voltage of the two-transistor flyback conversion circuit are usually fixed, or vary only within a small range. Therefore, the first duration may be alternatively preset in the control circuit, and the control circuit may directly control charging and discharging of the auxiliary winding based on the preset first duration. Comparatively, this implementation is simpler and more convenient.

For example, the auxiliary circuit may include the auxiliary winding, an auxiliary capacitor, and an auxiliary switching transistor, one end of the auxiliary capacitor is connected to a first end of the auxiliary winding, the other end of the auxiliary capacitor is connected to a second electrode of the auxiliary switching transistor, a first electrode of the auxiliary switching transistor is connected to a second end of the auxiliary winding, and a control electrode of the auxiliary switching transistor is connected to the control circuit. In this structure, when the control circuit controls the auxiliary circuit to charge the auxiliary winding, the control circuit may switch on the auxiliary switching transistor, so that the auxiliary capacitor charges the auxiliary winding. When the control circuit controls the auxiliary circuit to stop charging the auxiliary winding, the control circuit may switch off the auxiliary switching transistor, so that the auxiliary capacitor stops charging the auxiliary winding.

After controlling the auxiliary circuit to stop charging the auxiliary winding, the control circuit may further control the two-transistor flyback conversion circuit to continue to proceed with a charging stage. Further, at a second time point later than a first time point, the control circuit may control the primary-side circuit to charge the primary-side winding, where the first time point is a time point at which the auxiliary circuit is controlled to stop charging the auxiliary winding; and at a third time point later than the second time point, the control circuit may further control the primary-side circuit to stop charging the primary-side winding, and enable the primary-side winding to discharge to the secondary-side winding and the auxiliary winding.

For example, the primary-side circuit may include the primary-side winding, the first switching transistor, the second switching transistor, a first diode, a second diode, and an input capacitor. A first electrode of the first switching transistor is connected to one end of the input capacitor and a cathode of the first diode, the first electrode of the first switching transistor may receive the input voltage, a second electrode of the first switching transistor is connected to a cathode of the second diode and the first end of the primary-side winding, the second end of the primary-side winding is connected to an anode of the first diode and a first electrode of the second switching transistor, a second electrode of the second switching transistor is connected to an anode of the second diode, the second electrode of the second switching transistor is equipotentially connected to the other end of the input capacitor, and the control circuit is connected to a control electrode of the first switching transistor and a control electrode of the second switching transistor. In this structure, the control circuit may switch on the first switching transistor and the second switching transistor at the second time point, to control the primary-side circuit to charge the primary-side winding by using the input voltage. The control circuit may further switch off the first switching transistor and the second switching transistor at the third time point, to control the primary-side circuit to stop charging the primary-side winding, and enable the primary-side winding to discharge to the secondary-side winding and the auxiliary winding.

During a period from the first time point to the second time point, the auxiliary winding may discharge to the primary-side winding, to reduce a voltage between the first electrode and the second electrode of each of the first switching transistor and the second switching transistor in the primary-side circuit. In this way, at the second time point, when the control circuit controls the primary-side circuit to charge the primary-side winding, soft switching can be implemented for the first switching transistor and the second switching transistor.

In this embodiment of this application, a voltage between the first electrode and the second electrode of the first switching transistor is a first voltage, and a voltage between the first electrode and the second electrode of the second switching transistor is a second voltage. Usually, the second time point is not earlier than a time point at which neither a voltage value of the first voltage nor a voltage value of the second voltage is greater than a voltage threshold. In various embodiments, neither the voltage value of the first voltage nor the voltage value of the second voltage is greater than the voltage threshold at the second time point, thereby helping implement soft switching of the first switching transistor and the second switching transistor.

In this embodiment of this application, there are a plurality of possible implementations of determining the second time point. For example, the control circuit may be connected to the first electrode and the second electrode of the first switching transistor in the primary-side circuit and the first electrode and the second electrode of the second switching transistor in the primary-side circuit, where the second electrode of the first switching transistor is connected to the first end of the primary-side winding, and the first electrode of the second switching transistor is connected to the second end of the primary-side winding. In this case, the control circuit may detect the first voltage between the first electrode and the second electrode of the first switching transistor and the second voltage between the first electrode and the second electrode of the second switching transistor, and may further determine the second time point based on the first voltage and the second voltage. This implementation helps ensure that soft switching-on can be implemented each time the first switching transistor and the second switching transistor are switched on.

For another example, an interval between the second time point and the first time point is second duration, and the second duration may be a specified time length. Therefore, the second time point may be determined based on the second duration and the first time point. Comparatively, this implementation is simpler and more convenient.

According to a third aspect, an embodiment of this application further provides an electric vehicle. The electric vehicle may include the power module provided in any one of the implementations of the second aspect.

According to a fourth aspect, an embodiment of this application further provides a control method. The method may be used to control the two-transistor flyback conversion circuit provided in any one of the implementations of the first aspect to perform voltage conversion. For example, the control method may be applied to the control circuit in the power module provided in any one of the implementations of the second aspect. For a technical effect of a corresponding solution in the third aspect, refer to a technical effect that can be achieved in a corresponding solution in the first aspect or the second aspect. Repeated content is not described in detail again.

For example, the control method provided in this embodiment of this application is used to control a two-transistor flyback conversion circuit, where the two-transistor flyback conversion circuit includes a primary-side circuit, a secondary-side circuit, and an auxiliary circuit, the primary-side circuit includes a primary-side winding, the secondary-side circuit includes a secondary-side winding, the auxiliary circuit includes an auxiliary winding, and the primary-side winding, the secondary-side winding, and the auxiliary winding are coupled to each other. In this structure, the control method provided in this embodiment of this application mainly includes: before the primary-side circuit is controlled to charge the primary-side winding, controlling the auxiliary circuit to charge the auxiliary winding, so that the auxiliary winding stores electric energy; and controlling the auxiliary circuit to stop charging the auxiliary winding, and enabling the auxiliary winding to release the stored electric energy to the primary-side winding, so that a potential at a first end of the primary-side winding increases, and a potential at a second end of the primary-side winding decreases, where during charging of the auxiliary winding, the potential at the second end of the primary-side winding is higher than the potential at the first end of the primary-side winding.

First duration in which the auxiliary circuit is controlled to charge the auxiliary winding is positively related to an input voltage and an output voltage of the two-transistor flyback conversion circuit. In a possible implementation, before the auxiliary circuit is controlled to charge the auxiliary winding, the first duration may be further determined based on the input voltage and the output voltage of the two-transistor flyback conversion circuit. In various embodiments, a length of the first duration may be dynamically adjusted based on the input voltage and the output voltage. In another possible implementation, the first duration may be alternatively a specified time length.

For example, the auxiliary circuit may include the auxiliary winding, an auxiliary capacitor, and an auxiliary switching transistor, one end of the auxiliary capacitor is connected to a first end of the auxiliary winding, the other end of the auxiliary capacitor is connected to a second electrode of the auxiliary switching transistor, a first electrode of the auxiliary switching transistor is connected to a second end of the auxiliary winding, and a control electrode of the auxiliary switching transistor is connected to the control circuit. In this structure, when the auxiliary circuit is controlled to charge the auxiliary winding, the auxiliary switching transistor may be switched on, so that the auxiliary capacitor can charge the auxiliary winding. When the auxiliary circuit is controlled to stop charging the auxiliary winding, the auxiliary switching transistor may be switched off, so that the auxiliary capacitor stops charging the auxiliary winding, and the auxiliary winding discharges to the primary-side winding.

The auxiliary winding discharges to the primary-side winding, so that the potential at the first end of the primary-side winding can increase, and the potential at the second end can decrease. After soft switching can be implemented for a first diode and a second switching transistor, the primary-side circuit may be further controlled to charge the primary-side winding. For example, at a second time point later than a first time point, the primary-side circuit may be further controlled to charge the primary-side winding, where the first time point is a time point at which the auxiliary circuit is controlled to stop charging the auxiliary winding; and at a third time point later than the second time point, the primary-side circuit may be further controlled to stop charging the primary-side winding, and the primary-side winding is enabled to discharge to the secondary-side winding and the auxiliary winding.

During a period from the first time point to the second time point, the auxiliary winding may discharge to the primary-side winding, to reduce a voltage between the first electrode and the second electrode of each of the first switching transistor and the second switching transistor in the primary-side circuit. In this way, at the second time point, when the primary-side circuit is controlled to charge the primary-side winding, soft switching can be implemented for the first switching transistor and the second switching transistor.

For example, the primary-side circuit may include the primary-side winding, the first switching transistor, the second switching transistor, a first diode, a second diode, and an input capacitor. A first electrode of the first switching transistor is connected to one end of the input capacitor and a cathode of the first diode, the first electrode of the first switching transistor may receive the input voltage, a second electrode of the first switching transistor is connected to a cathode of the second diode and the first end of the primary-side winding, the second end of the primary-side winding is connected to an anode of the first diode and a first electrode of the second switching transistor, a second electrode of the second switching transistor is connected to an anode of the second diode, the second electrode of the second switching transistor is equipotentially connected to the other end of the input capacitor, and the control circuit is connected to a control electrode of the first switching transistor and a control electrode of the second switching transistor. In this structure, the first switching transistor and the second switching transistor may be switched on at the second time point, to control the primary-side circuit to charge the primary-side winding by using the input voltage. In addition, the first switching transistor and the second switching transistor may be further switched off at the third time point, to control the primary-side circuit to stop charging the primary-side winding, and enable the primary-side winding to discharge to the secondary-side winding and the auxiliary winding.

In this embodiment of this application, a voltage between the first electrode and the second electrode of the first switching transistor is a first voltage, and a voltage between the first electrode and the second electrode of the second switching transistor is a second voltage. Usually, the second time point is not earlier than a time point at which neither a voltage value of the first voltage nor a voltage value of the second voltage is greater than a voltage threshold.

In this embodiment of this application, there are a plurality of possible implementations of determining the second time point. For example, the first voltage between the first electrode and the second electrode of the first switching transistor in the primary-side circuit and the second voltage between the first electrode and the second electrode of the second switching transistor in the primary-side circuit may be detected, where the second electrode of the first switching transistor is connected to the first end of the primary-side winding, and the first electrode of the second switching transistor is connected to the second end of the primary-side winding; and the second time point is determined based on the first voltage and the second voltage.

For another example, an interval between the second time point and the first time point is second duration, and the second duration is a specified time length. Therefore, the second time point may be determined based on the second duration and the first time point.

These aspects or other aspects of this application are more readily apparent from the following description of embodiments.

DESCRIPTION OF EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment. It should be noted that in this application, "at least one" means one or more, and "plurality" means two or more. In view of this, "a plurality of" may also be understood as "at least two" in the embodiments of the present disclosure. The term "and/or" describes an association relationship between associated objects and represents that three relationships may exist. For example, A and/or B may represent the following three cases: Only A exists, both A and B exist, and only B exists. In addition, the character "/" generally indicates an "or" relationship between the associated objects unless specified otherwise. In addition, it should be understood that, in descriptions of this application, terms such as "first" and "second" are merely used for differentiation and description, but cannot be understood as an indication or implication of relative importance or an indication or implication of an order.

It should be noted that the "connection" in embodiments of this application refers to an electric connection, and the connection between two electrical elements may be a direct or indirect connection between the two electrical elements. For example, a connection between A and B may represent that A and B are directly connected to each other, or A and B are indirectly connected to each other by using one or more other electrical elements. For example, the connection between A and B may also represent that A is directly connected to C, C is directly connected to B, and A and B are connected to each other through C. In embodiments of this application, "coupling" may be coupling between two windings through an electromagnetic field, that is, electric energy may be transmitted between the two windings through the electromagnetic field; and mainly includes an energy conversion process of electric energy—magnetic field potential energy—electric energy.

The following clearly describes the technical solutions in embodiments of this application with reference to the accompanying drawings in embodiments of this application.

Figure 1:
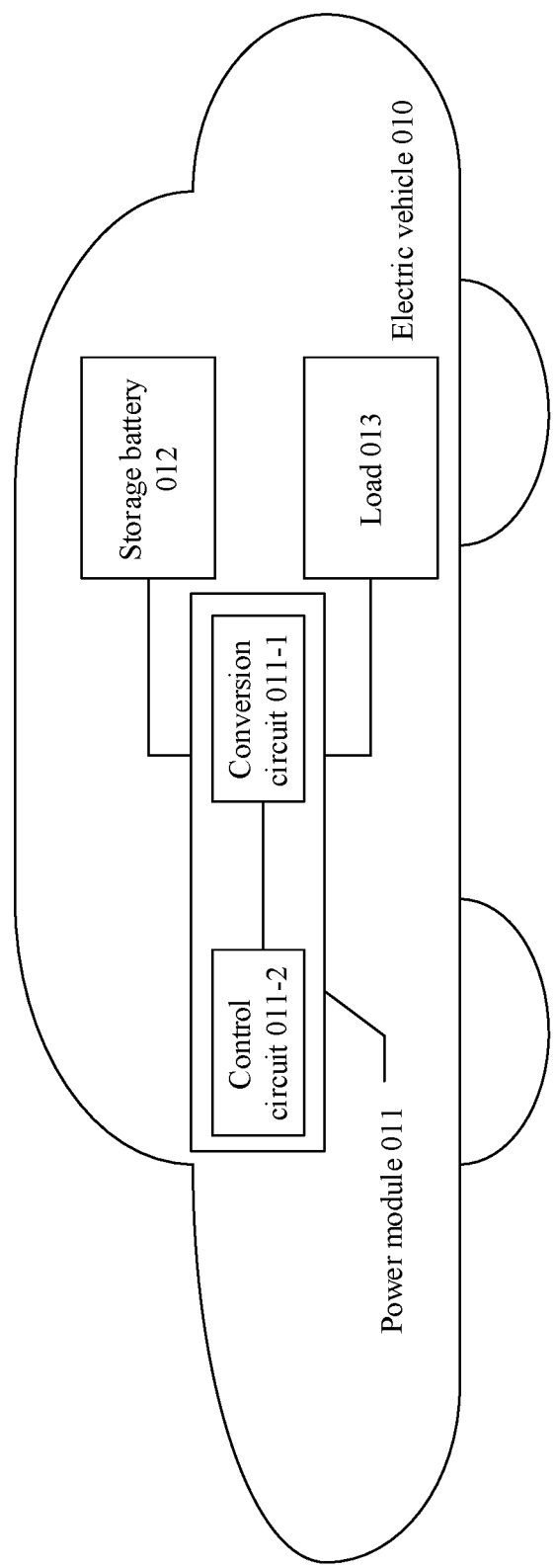
FIG. 1 is a schematic diagram of a structure of an electric vehicle.

A two-transistor flyback converter has a relatively low requirement on voltage withstand performance of a power switching transistor, and therefore is widely used in a high-voltage output scenario. For example, an electric vehicle 010 shown in FIG. 1 is used as an example. The electric vehicle 010 may include a power module 011 and a storage battery 012. The power module 011 may include a control circuit 011-2 and a conversion circuit 011-1.

In a possible implementation, the conversion circuit 011-1 may include an alternating current—direct current conversion circuit and a direct current—direct current conversion circuit, and the power module 011 may also be referred to as an inverter. When the electric vehicle is charged, the electric vehicle 010 may be connected to a three-phase power grid to receive a three-phase alternating current provided by the three-phase power grid. The control circuit 011-2 may control the alternating current—direct current conversion circuit in the conversion circuit 011-1 to convert the three-phase alternating current into a direct current, and control the direct current—direct current conversion circuit in the conversion circuit 011-1 to adjust a voltage of the direct current output by the alternating current—direct current conversion circuit, so as to provide a voltage-adapted direct current for the storage battery 012, so that the storage battery 012 can store the direct current.

In another possible implementation, the conversion circuit 011-1 may be alternatively a direct current—direct current conversion circuit, the electric vehicle 010 may further include a load 013, and the load 013 may be a vehicle-mounted device, a power system, or the like of the electric vehicle 010. The control circuit 011-2 in the power module 011 may further control the conversion circuit 011-1 to adjust a voltage of a direct current output by the storage battery, so as to provide a voltage-adapted direct current for the load 013.

However, regardless of application in charging of the electric vehicle 010 or application in power supply by the storage battery 012, the conversion circuit 011-1 usually has a relatively high input voltage. This imposes a relatively high requirement on voltage withstand performance of a power switching transistor in the conversion circuit 011-1, and also makes it difficult to select a power switching transistor.

The power switching transistor in the conversion circuit 011-1 is a triode that can withstand a relatively large current, has a relatively small leakage current, and has relatively good saturation, switching-on, and cut-off characteristics under specific conditions. In the conversion circuit 011-1, the power switching transistor is usually configured to control periodic voltage conversion. In the power module 011, a relatively high source-drain voltage is usually applied to the power switching transistor. Therefore, a relatively high requirement is imposed on voltage withstand performance of the power switching transistor. In various embodiments, the power switching transistor is required to still remain switched off under a relatively high source-drain voltage.

As an increasing requirement is imposed on voltage withstand performance of a power switching transistor, costs of a power switching transistor are increasing, and selection of a power switching transistor becomes increasingly difficult. In view of this, a two-transistor flyback conversion circuit with a relatively low requirement on voltage withstand performance of a power switching transistor is used in an increasing quantity of power modules 011.

Figure 2:
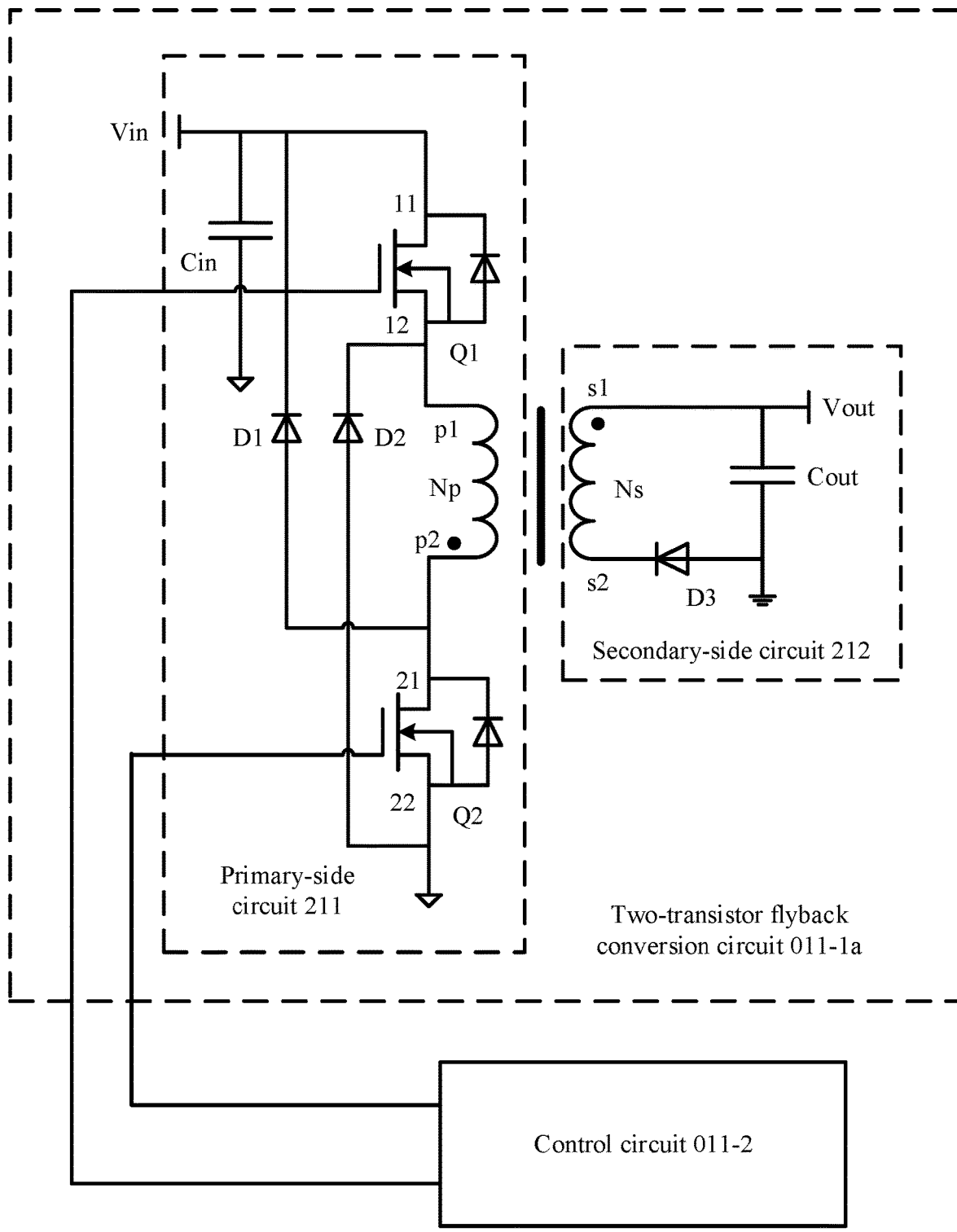
FIG. 2 is a schematic diagram of a circuit structure of a two-transistor flyback conversion circuit.

FIG. 2 is a schematic diagram of a circuit structure of a two-transistor flyback conversion circuit. The two-transistor flyback conversion circuit 011-1a may be a part or all of a circuit structure of the conversion circuit 011-1. As shown in FIG. 2, the two-transistor flyback conversion circuit 011-1a mainly includes a primary-side circuit 211 and a secondary-side circuit 212. The primary-side circuit 211 includes an input capacitor Cin, a switching transistor Q1, a primary-side winding Np, a switching transistor Q2, a diode D1, and a diode D2. One end of the input capacitor Cin is connected to a first electrode 11 of the switching transistor Q1. A second electrode 12 of the switching transistor Q1 is connected to a first end p1 of the primary-side winding Np and a cathode of the diode D2. A second end p2 of the primary-side winding Np is connected to a first electrode 21 of the switching transistor Q2 and an anode of the diode D1, and a second electrode 22 of the switching transistor Q2 and the other end of the input capacitor Cin are equipotential. A cathode of the diode D1 is connected to the first electrode 11 of the switching transistor Q1, and an anode of the diode D2 is connected to the second electrode 22 of the switching transistor Q2.

It should be noted that, in this embodiment of this application, two equipotential ends may be directly electrically connected, or may be connected through an equipotential line. For example, the second electrode 22 of the switching transistor Q2 and the other end of the input capacitor Cin may be directly electrically connected; or each may be connected to an equipotential line, and are equipotential through the equipotential line. This is not limited in this embodiment of this application. Usually, equipotential points connected equipotentially may also be considered as zero-potential points.

The secondary-side circuit 212 includes a secondary-side winding Ns, a diode D3, and an output capacitor Cout. A first end s1 of the secondary-side winding Ns is connected to one end of the output capacitor Cout, a second end s2 of the secondary-side winding Ns is connected to a cathode of the diode D3, an anode of the diode D3 is connected to the other end of the output capacitor Cout, and the other end of the output capacitor Cout is grounded. The primary-side winding Np and the secondary-side winding Ns are coupled to constitute a transformer structure, and the second end p2 of the primary-side winding Np and the first end s1 of the secondary-side winding Ns are dotted terminals.

In this embodiment of this application, the switching transistor Q1 and the switching transistor Q2 are power switching transistors. Usually, transistors with relatively high voltage withstand performance may be selected as the switching transistor Q1 and the switching transistor Q2. For example, the switching transistor Q1 and the switching transistor Q2 may be metal-oxide-semiconductor (MOS) transistors, silicon carbide (SiC) transistors, or gallium nitride (GaN) high electron mobility transistors (HEMT).

The first electrode 11 of the switching transistor Q1 may be a source of the switching transistor Q1, and the second electrode 12 may be a drain of the switching transistor Q1; or the first electrode 11 of the switching transistor Q1 may be a drain of the switching transistor Q1, and the second electrode 12 may be a source of the switching transistor Q1. A case of the switching transistor Q2 is similar and is not described in detail again. It should be understood that there is not necessarily a relationship between the first electrode 11 of the switching transistor Q1 and the first electrode 21 of the switching transistor Q2. For example, when the first electrode 11 of the switching transistor Q1 is the source of the switching transistor Q1, the first electrode 21 of the switching transistor Q2 may be a source of the switching transistor Q2 or a drain of the switching transistor Q2.

Both a control electrode (a gate) of the switching transistor Q1 and a control electrode of the switching transistor Q2 may be connected to the control circuit 011-2, so that the control circuit 011-2 can control the two-transistor flyback conversion circuit 011-1a to perform periodic voltage conversion. Each voltage conversion period mainly includes a charging stage and a discharging stage. Details are as follows:

1. Charging Stage

In the charging stage, the control circuit 011-2 controls the switching transistor Q1 and the switching transistor Q2 to be switched on. The diode D1 and the diode D2 are cut off, and the primary-side winding Np is charged by using the input voltage Vin. During charging of the primary-side winding Np, a voltage of the primary-side winding Np gradually increases. In this case, an induced voltage of the secondary-side winding Ns may enable the diode D3 to be cut off. Therefore, the secondary-side winding Ns can be prevented from discharging, so that the primary-side winding Np can be continuously charged.

2. Discharging Stage

In the discharging stage, the switching transistor Q1 and the switching transistor Q2 are switched off, and the primary-side winding Np discharges to the secondary-side winding Ns. In this case, the first end p1 of the primary-side winding Np is a low-potential end, and the second end p2 is a high-potential end. It can be learned from FIG. 2 that a voltage of the secondary-side winding Ns may enable the diode D3 to be switched on. Therefore, energy stored in the primary-side winding Np may be released to the secondary-side winding Ns, that is, the primary-side winding Np discharges, so that the secondary-side circuit 212 may output an output voltage Vout.

It can be learned from FIG. 2 that, in the discharging stage, the voltage of the primary-side winding Np may enable the diode D2 and the diode D1 to be switched on, so that the primary-side winding Np, the diode D2, the diode D1, and the input capacitor Cin can constitute a discharging loop, and the input capacitor Cin can recover leakage inductance energy in the primary-side winding Np.

Further, due to a leakage inductance effect, the primary-side winding Np may be equivalent to a leakage inductor and an effective inductor that are connected in series. Energy stored in the effective inductor may be completely released to the secondary-side winding Ns, but leakage inductance energy stored in the leakage inductor cannot be coupled to the secondary-side winding Ns.

In the discharging stage of the two-transistor flyback conversion circuit 011-1a, because the primary-side winding Np, the diode D2, the diode D1, and the input capacitor Cin constitute the discharging loop, energy in the leakage inductor may be stored in the input capacitor Cin. In a charging stage of a next voltage conversion period, the primary-side winding Np may also be charged by using the energy stored in the input capacitor Cin, so that the energy in the leakage inductor can be utilized. In other words, the two-transistor flyback conversion circuit 011-1a can recover the leakage inductance energy, thereby helping reduce leakage inductance loss and improve conversion efficiency of the two-transistor flyback conversion circuit 011-1a.

In addition to higher conversion efficiency, the two-transistor flyback conversion circuit 011-1a can further reduce a requirement on voltage withstand performance of the power switching transistors (the switching transistor Q1 and the switching transistor Q2) compared with a single-transistor flyback conversion circuit. Further, the single-transistor flyback conversion circuit is a flyback conversion circuit in which a primary-side circuit includes only one power switching transistor. When the power switching transistor is switched off, a voltage between a first electrode and a second electrode of the power switching transistor is equal to Vin+nVout, where n is a ratio of a quantity of turns of the primary-side winding to a quantity of turns of the secondary-side winding.

However, the primary-side circuit 211 of the two-transistor flyback conversion circuit 011-1a includes the switching transistor Q1 and the switching transistor Q2. For ease of description, in this embodiment of this application, a voltage between the first electrode and the second electrode of the switching transistor Q1 is denoted as $V_{Q1}$, and a voltage between the first electrode and the second electrode of the switching transistor Q2 is denoted as $V_{Q2}$. When the switching transistor Q1 and the switching transistor Q2 are switched off, $V_{Q1}+V_{Q2}$=Vin+nVout. Usually, the switching transistor Q1 and the switching transistor Q2 have a same specification. Therefore, it may be considered that $V_{Q1}=V_{Q2}$=(Vin+nVout)/2.

It can be learned that, compared with the single-transistor flyback conversion circuit, under a same input voltage Vin and a same output voltage Vout, the two-transistor flyback conversion circuit 011-1a can reduce the voltage between the first electrode and the second electrode of the power switching transistor (the switching transistor Q1 and the switching transistor Q2) by half, thereby helping reduce a requirement on voltage withstand performance of the power switching transistor.

To sum up, the two-transistor flyback conversion circuit 011-1a has advantages such as high conversion efficiency and a relatively low requirement on voltage withstand performance of a power switching transistor, and therefore is well applicable to an application scenario in which an input voltage Vin is relatively high. However, currently, only hard switching can be implemented for the power switching transistors in the two-transistor flyback conversion circuit 011-1a. This increases loss of the two-transistor flyback conversion circuit 011-1a, and is not conducive to further improvement on conversion efficiency of the two-transistor flyback conversion circuit.

The hard switching means that there is a relatively high voltage between the first electrode and the second electrode when the power switching transistor is switched on. As shown in the foregoing example, in the switching transistor Q1 and the switching transistor Q2, $V_{Q1}=V_{Q2}$=(Vin+nVout)/2. When the power switching transistor is switched on, energy stored in a parasitic capacitor of the power switching transistor is consumed inside the power switching transistor in a form of a current. This increases loss of the two-transistor flyback conversion circuit 011-1a, and has negative impact on conversion efficiency of the two-transistor flyback conversion circuit 011-1a. In addition, even if a quantity of times of switching on and off the power switching transistor in a unit time may be reduced to reduce total loss caused by the hard switching of the power switching transistor, this restricts an operating frequency of the two-transistor flyback conversion circuit 011-1a.

In view of this, an embodiment of this application provides a two-transistor flyback conversion circuit. The two-transistor flyback conversion circuit includes an auxiliary circuit. The auxiliary circuit may increase a potential at a first end p1 of a primary-side winding Np and decrease a potential at a second end p2 of the primary-side winding Np before the primary-side winding Np is charged. In this way, a voltage between a first electrode and a second electrode of a power switching transistor in a primary-side circuit can be adjusted, so that the voltage between the first electrode and the second electrode approaches 0 before the power switching transistor is switched on, thereby helping implement soft switching.

It should be noted that the two-transistor flyback conversion circuit provided in this embodiment of this application may be applied to any power module, and the power module may be a module that integrates a two-transistor flyback conversion circuit, for example, a power module. The power module may be either a direct current—direct current power module or an alternating current—direct current power module. The two-transistor flyback conversion circuit may be all or a part of a conversion circuit in the power module. This is not limited in this embodiment of this application. The power module provided in this embodiment of this application may be applied to a plurality of types of electronic devices, for example, an electric vehicle, a data center, and a transformer box.

Figure 3:
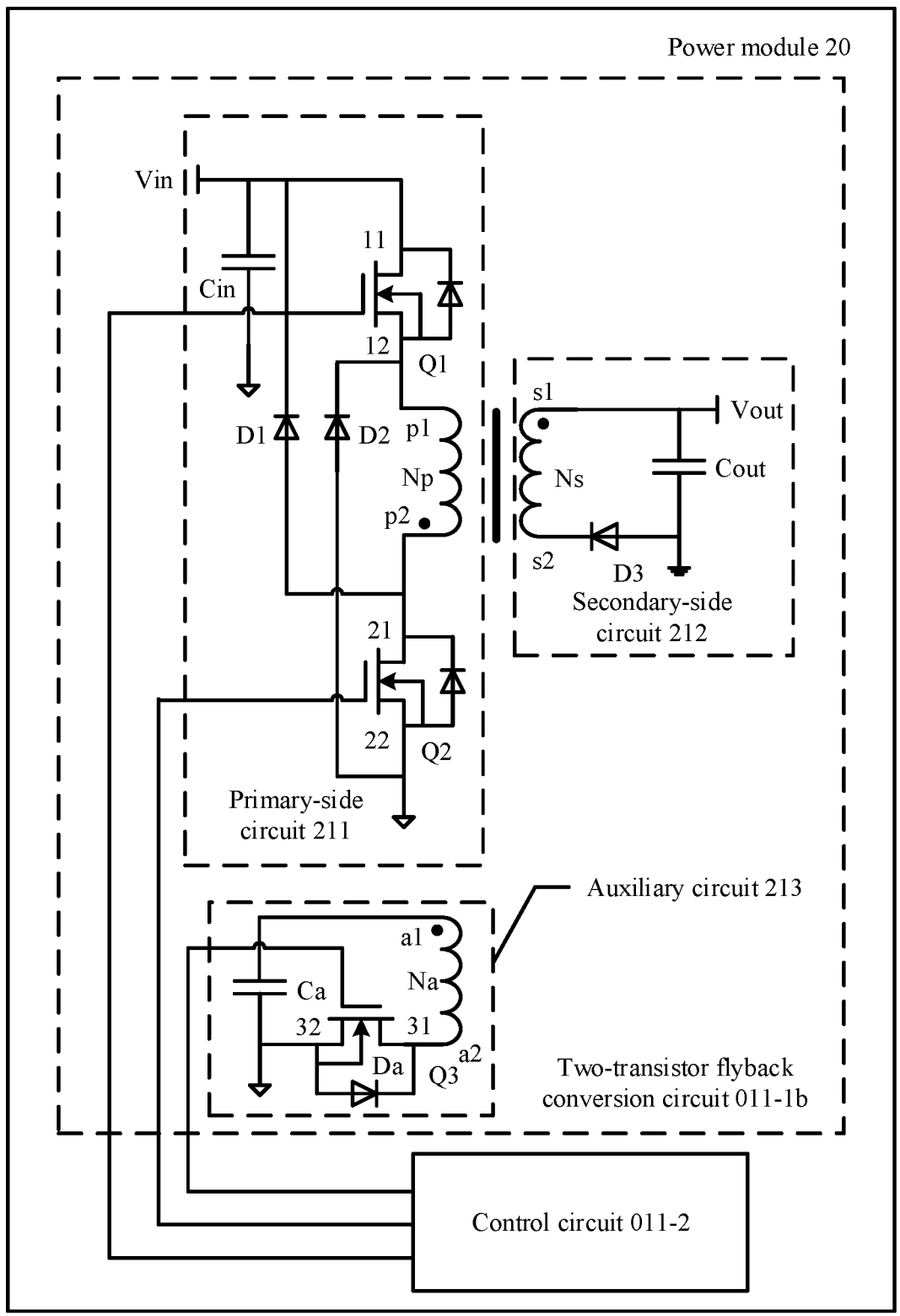
FIG. 3 is a schematic diagram of a structure of a power module according to an embodiment of this application.

FIG. 3 is an example schematic diagram of a structure of a power module according to an embodiment of this application. As shown in FIG. 3, the power module 20 mainly includes a two-transistor flyback conversion circuit 011-1b and a control circuit 011-2. The control circuit 011-2 may control the two-transistor flyback conversion circuit 011-1b to perform voltage conversion. The following further separately describes the two-transistor flyback conversion circuit 011-1b and the control circuit 011-2 by using examples.

Two-Transistor Flyback Conversion Circuit 011-1b

As shown in FIG. 3, the two-transistor flyback conversion circuit 011-1b mainly includes a primary-side circuit 211, a secondary-side circuit 212, and an auxiliary circuit 213. The primary-side circuit 211 includes a primary-side winding Np, and is mainly configured to receive an input voltage Vin, and charge the primary-side winding Np by using the input voltage Vin under control of the control circuit 011-2.

It should be noted that the output voltage Vin may be a voltage received by the power module 20, or may be a voltage provided by a front-end circuit (for example, an alternating current—direct current conversion circuit) of the two-transistor flyback conversion circuit 011-1b in the power module 20 for the two-transistor flyback conversion circuit 011-1b. This is not limited in this embodiment of this application.

For a specific structure of the primary-side circuit 211 in this embodiment of this application, refer to a structure of a primary-side circuit in a current conventional two-transistor flyback conversion circuit. For example, as shown in FIG. 3, the primary-side circuit 211 mainly includes the primary-side winding Np, a switching transistor Q1 (a first switching transistor), and a switching transistor Q2 (a second switching transistor). A first electrode 11 of the switching transistor Q1 may receive the input voltage Vin, a second electrode 22 of the switching transistor Q1 is connected to a first end p1 of the primary-side winding Np, and a first electrode 21 of the switching transistor Q2 is connected to a second end p2 of the primary-side winding Np.

In addition, the primary-side circuit 211 may further include an input capacitor Cin, a diode D1, and a diode D2. One end of the input capacitor Cin is connected to the first electrode 11 of the switching transistor Q1, and the other end of the input capacitor Cin and a second electrode 22 of the switching transistor Q2 are equipotential. An anode of the diode D1 is connected to the second end p2 of the primary-side winding Np, and a cathode of the diode D1 is connected to the first electrode 11 of the switching transistor Q1. An anode of the diode D2 is connected to the second electrode 22 of the switching transistor Q2, and a cathode of the diode D2 is connected to the second electrode 12 of the switching transistor Q1.

It should be noted that the structure of the primary-side circuit 211 shown in FIG. 3 is merely an example. With advancement of researches on the two-transistor flyback conversion circuit 011-1b, the structure of the primary-side circuit 211 may vary to some extent, and these structures should also be included in this embodiment of this application.

The secondary-side circuit 212 includes a secondary-side winding Ns, and the secondary-side winding Ns is coupled to the primary-side winding Np. In addition, the secondary-side circuit 212 further has a one-way switching-on characteristic. The secondary-side circuit 212 may receive electric energy released by the primary-side circuit 211 and output an output voltage Vout.

For a specific structure of the secondary-side circuit 212 in this embodiment of this application, refer to a structure of a secondary-side circuit in the current conventional two-transistor flyback conversion circuit. For example, as shown in FIG. 3, the secondary-side circuit 212 mainly includes the secondary-side winding Ns, a diode D3, and an output capacitor Cout. A first end s1 of the secondary-side winding Ns is connected to one end of the output capacitor Cout, and is configured to output the output voltage Vout. A second end s2 of the secondary-side winding Ns is connected to a cathode of the diode D3, and the other end of the diode D3 and the other end of the output capacitor Cout are grounded.

In FIG. 3, the primary-side winding Np and the secondary-side winding Ns are coupled through a magnetic field to constitute a transformer structure, and the second end p2 of the primary-side winding Np and the first end s1 of the secondary-side winding Ns are dotted terminals. It should be understood that, for operating principles of the primary-side circuit 211 and the secondary-side circuit 212, reference may be made to the primary-side circuit and the secondary-side circuit in the conventional two-transistor flyback conversion circuit. Details are not described herein again.

As shown in FIG. 3, to implement soft switching of the switching transistor Q1 and the switching transistor Q2, the two-transistor flyback conversion circuit 011-1b provided in this embodiment of this application further includes the auxiliary circuit 213. The auxiliary circuit 213 includes an auxiliary winding Na. The auxiliary winding Na and the primary-side winding Np may be coupled through an electromagnetic field, so that electric energy can be transmitted between the primary-side circuit 211 and the auxiliary circuit 213.

Currently, a voltage conversion period mainly includes a charging stage of the primary-side winding Np and a discharging stage of the primary-side winding Np. However, in this embodiment of this application, a charging stage of the auxiliary winding Na and a discharging stage of the auxiliary winding Na may be further added before the charging stage of the primary-side winding Np.

Further, before the primary-side circuit 211 charges the primary-side winding Np, the auxiliary circuit 213 may charge the auxiliary winding Na, so that the auxiliary winding Na stores electric energy; and after the charging of the auxiliary winding Na is stopped, the auxiliary circuit 213 may further enable the auxiliary winding Na to release the stored electric energy to the primary-side winding Np. During charging of the auxiliary winding Na, the first end p1 of the primary-side winding Np is a low-potential end, and the second end p2 is a high-potential end. During discharging of the auxiliary winding Na to the primary-side winding Np, a potential at the first end p1 of the primary-side winding Np gradually increases, and a potential at the second end p2 gradually decreases.

In this embodiment of this application, during charging of the auxiliary winding Na, the first end p1 of the primary-side winding Np is a low-potential end, and the second end p2 is a high-potential end. Further, the switching transistor Q1 and the switching transistor Q2 are switched off before the charging of the primary-side winding Np starts. In this state, relative potential magnitudes at both ends of the primary-side winding Np depend on relative potential magnitudes at both ends of the secondary-side winding Ns. As shown in FIG. 3, the first end s1 of the secondary-side winding Ns is a high-potential end, and the first end s1 of the secondary-side winding Ns and the second end p2 of the primary-side winding Np are dotted terminals. Therefore, the second end p2 of the primary-side winding is a high-potential end. Correspondingly, the first end p1 of the primary-side winding Np is a low-potential end.

Because the auxiliary winding Na is coupled to the primary-side winding Np, the auxiliary winding Na may discharge to the primary-side winding Np after the charging of the auxiliary winding Na stops. As shown in FIG. 3, a first end a1 of the auxiliary winding Na and the second end p2 of the primary-side winding Np are dotted terminals. Therefore, during discharging of the auxiliary winding Na to the primary-side winding Np, an induced current that flows from the second end p2 to the first end p1 may be generated in the primary-side winding Np, so that the potential at the high-potential end (the second end p2) gradually decreases, and the potential at the low-potential end (the first end p1) gradually increases.

The potential at the first end p1 of the primary-side winding Np is equal to a potential at the second electrode 12 of the switching transistor Q1. When the auxiliary winding Na discharges, the potential at the first end p1 of the primary-side winding Np increases, that is, the potential at the second electrode 12 of the switching transistor Q1 increases. In addition, a potential at the first electrode 11 of the switching transistor Q1 is fixed at a high potential Vin. Therefore, after the potential at the second electrode 12 of the switching transistor Q1 increases, a potential difference between the first electrode 11 and the second electrode 12 of the switching transistor Q1 may be reduced, that is, $V_{Q1}$ between the first electrode 11 and the second electrode 12 is reduced, thereby helping implement soft switching of the switching transistor Q1.

In addition, the potential at the second end p2 of the primary-side winding Np is equal to a potential at the first electrode 21 of the switching transistor Q2. When the auxiliary winding Na discharges, the potential at the second end p2 of the primary-side winding Np decreases, that is, the potential at the first electrode 21 of the switching transistor Q2 decreases. A potential at the second electrode 22 of the switching transistor Q2 is fixed at a low potential 0. Therefore, after the potential at the first electrode 21 of the switching transistor Q2 decreases, a potential difference between the first electrode 21 and the second electrode 22 of the switching transistor Q2 may be reduced, that is, $V_{Q2}$ between the first electrode 21 and the second electrode 22 is reduced, thereby helping implement soft switching of the switching transistor Q2.

Next, this embodiment of this application further describes a structure of the auxiliary circuit 213 by using an example. It should be understood that, when a coupling relationship between the auxiliary winding Na and the primary-side winding Np is maintained, a specific implementation of the auxiliary circuit 213 is not limited in this embodiment of this application. In actual implementation, the auxiliary circuit 213 may include more or fewer elements. These cases should also be included in this embodiment of this application.

As shown in FIG. 3, the auxiliary circuit 213 may include the auxiliary winding Na, an auxiliary capacitor Ca, and an auxiliary switching transistor Q3. One end of the auxiliary capacitor Ca is connected to the first end a1 of the auxiliary winding Na, the other end of the auxiliary capacitor Ca is connected to a second electrode 32 of the auxiliary switching transistor Q3, a first electrode 31 of the auxiliary switching transistor Q3 is connected to a second end a2 of the auxiliary winding Na, and the other end of the auxiliary capacitor Ca and the second electrode of the switching transistor Q2 are equipotential.

Based on the auxiliary circuit 213 shown in FIG. 3, after being switched on, the auxiliary switching transistor Q3 may enable the auxiliary capacitor Ca to charge the auxiliary winding Na. After being switched off, the auxiliary switching transistor Q3 may further enable the auxiliary capacitor Ca to stop charging the auxiliary winding Na, and enable the auxiliary winding Na to discharge to the primary-side winding Np.

Control Circuit 011-2

In this embodiment of this application, the control circuit 011-2 may control the two-transistor flyback conversion circuit 011-1b to perform voltage conversion. For example, the control circuit 011-2 may be a controller, a central processing unit (CPU), a processor, digital signal processing (DSP), an application-specific integrated circuit (ASIC), a field programmable gate array (FPGA) or another programmable logic device, a transistor logic device, a hardware component, or any combination thereof. This is not limited in this embodiment of this application.

The control circuit 011-2 may be connected to a control end of the two-transistor flyback conversion circuit 011-1b. The control end of the two-transistor flyback conversion circuit 011-1b includes a control electrode (a gate) of each switching transistor in the two-transistor flyback conversion circuit 011-1b. The control circuit 011-2 may control switching-on and switching-off of each switching transistor to control the two-transistor flyback conversion circuit 011-1b to perform voltage conversion.

For example, the control circuit 011-2 may be connected to a control electrode of the switching transistor Q1 and a control electrode of the switching transistor Q2, and control switching-on and switching-off of the switching transistor Q1 and the switching transistor Q2 to control charging and discharging of the primary-side winding Np. For another example, the control circuit 011-2 may be further connected to a control electrode of the auxiliary switching transistor Q3, and control switching-on and switching-off of the auxiliary switching transistor Q3 to control charging and discharging of the auxiliary winding Na.

It should be noted that, because the auxiliary circuit 213 is added to the two-transistor flyback conversion circuit 011-1b in this embodiment of this application, and correspondingly, a voltage conversion period in this embodiment of this application may mainly include the following four stages: a charging stage of the auxiliary winding Na, a discharging stage of the auxiliary winding Na, a charging stage of the primary-side winding Np, and a discharging stage of the primary-side winding Np. The following further describes the four stages by using examples.

1. Charging Stage of the Auxiliary Winding Na

Before controlling the primary-side circuit 211 to charge the primary-side winding Np, the control circuit 011-2 may control the auxiliary circuit 213 to charge the auxiliary winding Na, so that the auxiliary winding Na stores electric energy.

For example, in the power module 20 shown in FIG. 3, the control circuit 011-2 is connected to the control electrode of the auxiliary switching transistor Q3, to control switching-on and switching-off of the auxiliary switching transistor Q3 by using a drive signal. The drive signal provided by the control circuit 011-2 for the auxiliary switching transistor Q3 may be indicated by a dashed line in FIG. 4.

Figure 4:
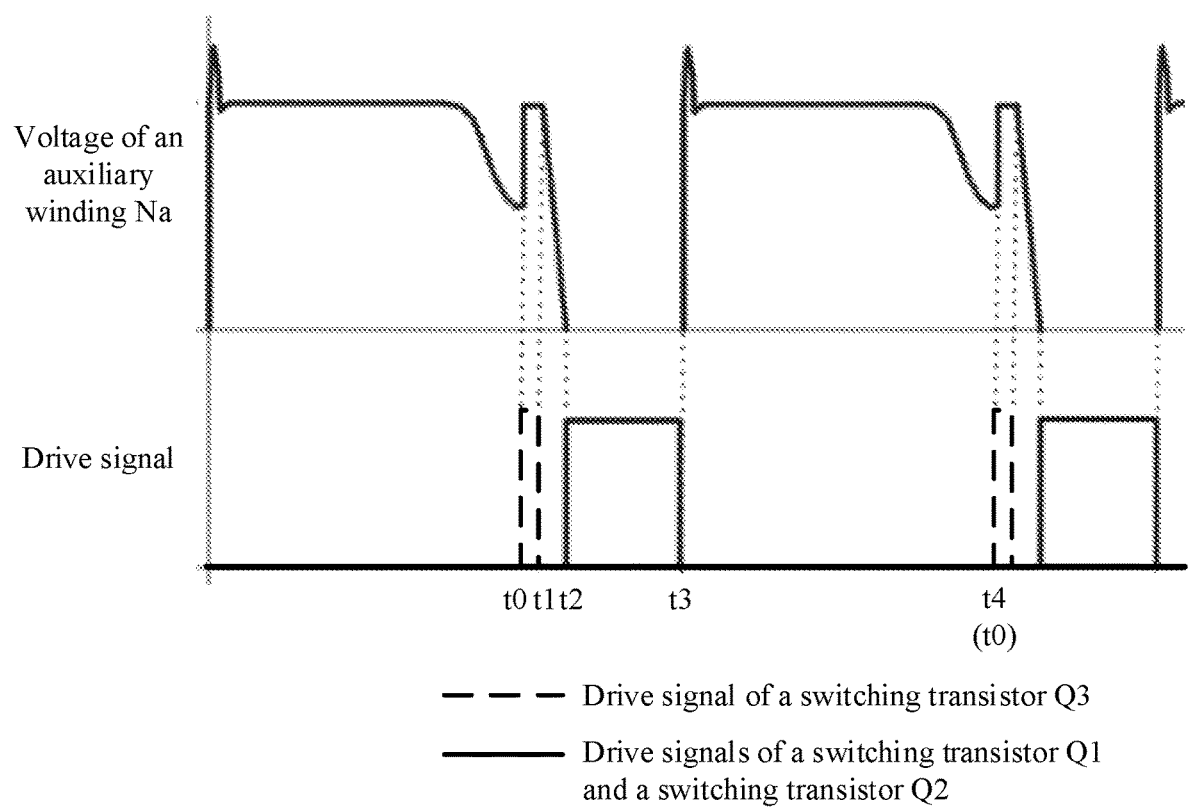
FIG. 4 is a schematic diagram of a voltage change of a drive signal and an auxiliary winding according to an embodiment of this application.

It should be noted that the drive signal shown in FIG. 4 is merely an example. The drive signal shown in FIG. 4 is a drive signal based on a case in which the switching transistor Q1, the switching transistor Q2, and the auxiliary switching transistor Q3 are all N-type metal-oxide-semiconductor (NMOS) transistors. In actual implementation, one or more of the switching transistor Q1, the switching transistor Q2, and the auxiliary switching transistor Q3 may be alternatively one or more P-type metal-oxide-semiconductor (PMOS) transistors or other switching transistors switched on at a low level. In this case, the drive signal also needs to be adjusted accordingly. This is not described in detail in this embodiment of this application.

It can be learned from FIG. 4 that the control circuit 011-2 may switch on the auxiliary switching transistor Q3 at an initial time point to, to control the auxiliary circuit 213 to charge the auxiliary winding Na; and switch off the auxiliary switching transistor Q3 at a first time point t1 later than the initial time point t0, to control the auxiliary circuit 213 to stop charging the auxiliary winding Na. An interval between the first time point t1 and the initial time point t0 is first duration $\Delta t1$. When the first duration $\Delta t1$ reaches a specific length, soft switching can be implemented for the switching transistor Q1 and the switching transistor Q2. It should be noted that, even if the first duration $\Delta t1$ is relatively short, energy released by the auxiliary winding Na to the primary-side winding Np can still reduce magnitudes of VQ1 and VQ2, and also help reduce loss that occurs at a moment at which the switching transistor Q1 and the switching transistor Q2 are switched on.

In a possible implementation, the first duration $\Delta t1$ is positively related to the input voltage Vin and the output voltage Vout of the two-transistor flyback conversion circuit 011-1b. Further, because VQ1=VQ2=(Vin+nVout)/2, a higher input voltage Vin and a higher output voltage Vout indicate longer first duration $\Delta t1$, so that electric energy released by the auxiliary winding Na is sufficient to implement soft switching of the switching transistor Q1 and the switching transistor Q2. On the contrary, a lower input voltage Vin and a lower output voltage Vout indicate shorter first duration $\Delta t1$, to shorten a period length of a voltage conversion period.

In this embodiment of this application, the control circuit 011-2 may determine the first duration $\Delta t1$ based on the input voltage Vin and the output voltage Vout. To be specific, the control circuit 011-2 may dynamically adjust the first duration $\Delta t1$ based on the input voltage Vin and the output voltage Vout. With this implementation, the control circuit 011-2 can flexibly adapt to changes of the input voltage Vin and the output voltage Vout, so that soft switching can be implemented for the switching transistor Q1 and the switching transistor Q2 in different application scenarios.

In another possible implementation, the first duration $\Delta t1$ may be a specified time length. Further, with respect to only one two-transistor flyback conversion circuit 011-1b, an input voltage Vin and an output voltage Vout of the two-transistor flyback conversion circuit 011-1b are usually fixed, or vary only within a small range. Therefore, the first duration $\Delta t1$ may be alternatively preset in the control circuit 011-2, and the control circuit 011-2 may directly control charging and discharging of the auxiliary winding Na based on the preset first duration $\Delta t1$. Comparatively, this implementation is simpler and more convenient.

2. Discharging Stage of the Auxiliary Winding Na

As shown in FIG. 4, the control circuit 011-2 may switch off the auxiliary switching transistor Q3 at the first time point t1 later than the initial time point to, so that the auxiliary circuit 213 stops charging the auxiliary winding Na, and the auxiliary winding Na releases stored electric energy to the primary-side winding Np.

During discharging of the auxiliary winding Na, a voltage of the auxiliary winding Na gradually decreases. As the auxiliary winding Na discharges to the primary-side winding Np, the potential at the first end p1 of the primary-side winding Np gradually increases, the potential at the second end p2 of the primary-side winding Np gradually decreases, and VQ1 of the switching transistor Q1 and VQ2 of the switching transistor Q2 gradually approach 0. A specific principle is not described in detail.

Further, as shown in FIG. 4, the control circuit 011-2 may further switch on the switching transistor Q1 and the switching transistor Q2 at a second time point t2 later than the first time point t1. In this embodiment of this application, the second time point t2 is not earlier than a time point at which neither a voltage value of VQ1 of the switching transistor Q1 nor a voltage value of VQ2 of the switching transistor Q2 is greater than a voltage threshold. Usually, a value of the voltage threshold is relatively small. Therefore, this may be understood as that both VQ1 of the switching transistor Q1 and VQ2 of the switching transistor Q2 are 0 or approach 0 at the second time point t2.

This may also be understood that the auxiliary winding Na discharges to the primary-side winding Np so that the potential at the first end p1 of the primary-side winding Np can increase to the potential at the first electrode 11 of the switching transistor Q1 and the potential at the second end p2 of the primary-side winding Np can decrease to the potential at the second electrode 22 of the switching transistor Q2. In this case, VQ1 of the switching transistor Q1 and VQ2 of the switching transistor Q2 approach 0, thereby helping implement soft switching of the switching transistor Q1 and the switching transistor Q2.

Figure 5:
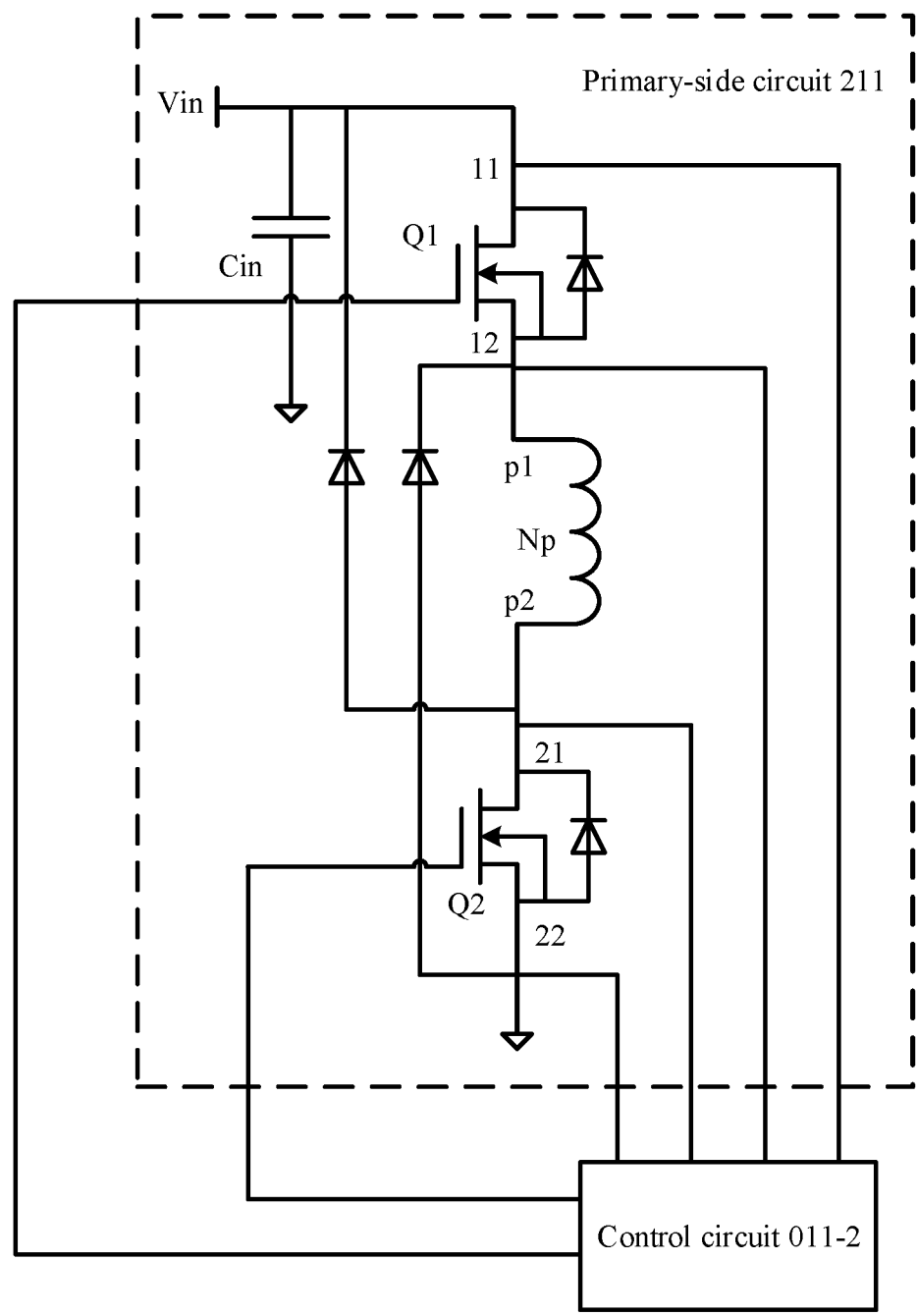
FIG. 5 is a schematic diagram of a partial structure of a power module according to an embodiment of this application.

In this embodiment of this application, there are a plurality of possible implementations of determining the second time point t2 by the control circuit 011-2. For example, FIG. 5 is an example schematic enlarged view of a partial structure of the power module 20. The control circuit 011-2 is connected to the first electrode 11 and the second electrode 12 of the switching transistor Q1 and the first electrode 21 and the second electrode 22 of the switching transistor Q2. The control circuit 011-2 may detect VQ1 between the first electrode 11 and the second electrode 12 of the switching transistor Q1 and VQ2 between the first electrode 21 and the second electrode 22 of the switching transistor Q2.

The control circuit 011-2 may determine, based on the voltage value of VQ1 and the voltage value of VQ2, the second time point at which the switching transistor Q1 and the switching transistor Q2 are to be switched on. When neither the voltage value of VQ1 nor the voltage value of VQ2 is greater than the voltage threshold, it may be considered that soft switching can be implemented for the switching transistor Q1 and the switching transistor Q2. Therefore, the control circuit 011-2 may switch on the switching transistor Q1 and the switching transistor Q2 after neither the voltage value of the voltage VQ1 nor the voltage value of the voltage VQ2 is greater than the voltage threshold.

In another possible implementation, an interval between the second time point t2 and the first time point t1 is second duration $\Delta t2$, and the second duration $\Delta t2$ may be a specified time length. Further, duration of the second duration $\Delta t2$ may be preset in the control circuit 011-2, and the control circuit 011-2 may directly determine the second time point t2 by using the specified time length. For example, the specified time length of the second duration $\Delta t2$ may be obtained through simulation and estimation, experimental testing, or the like. This is not limited in this embodiment of this application.

3. Charging Stage of the Primary-Side Winding Np

After switching on the switching transistor Q1 and the switching transistor Q2 at the second time point t2, the control circuit 011-2 can control the primary-side circuit 211 to charge the primary-side winding Np. As shown in FIG. 4, the primary-side winding Np may be continuously charged after the second time point t2, until the control circuit 011-2 switches off the switching transistor Q1 and the switching transistor Q2 at a third time point t3 later than the second time point t2. During charging of the primary-side winding Np, the secondary-side diode D3 in the secondary-side circuit 212 is cut off, so that the primary-side winding Np cannot discharge to the secondary-side winding Ns.

As shown in FIG. 3, in a possible implementation, the auxiliary switching transistor Q3 includes a body diode Da, an anode of the body diode Da is connected to the other end of the auxiliary capacitor Ca, and a cathode of the body diode Da is connected to the second end a2 of the auxiliary winding Na. In the charging stage of the primary-side winding Np, the auxiliary switching transistor Q3 is switched off, and an induced voltage of the auxiliary winding Na enables the body diode Da to be cut off, so that the primary-side winding Np cannot discharge to the auxiliary winding Na.

To sum up, in the charging stage of the primary-side winding Np, the primary-side winding Np can neither discharge to the secondary-side winding Ns nor discharge to the auxiliary winding Na, so that the primary-side winding Np can be continuously charged.

4. Discharging Stage of the Primary-Side Winding Np

As shown in FIG. 4, the control circuit 011-2 switches off the switching transistor Q1 and the switching transistor Q2 at the third time point t3, so that the primary-side winding Np discharges. During discharging of the primary-side winding Np, the secondary-side diode D3 is switched on, and the secondary-side winding Na may receive a part of electric energy released by the primary-side winding Np, to output the output voltage Vout. The output capacitor Cout may filter the output voltage Vout, to improve stability of the output voltage Vout.

The auxiliary winding Na may receive the other part of electric energy released by the primary-side winding Np, and store the received electric energy in the auxiliary capacitor Ca. In this way, the auxiliary capacitor Ca can continue to charge the auxiliary winding Na by using the stored electric energy in a next voltage conversion period.

Further, as shown in FIG. 4, in the discharging stage of the primary-side winding Np, the body diode of the auxiliary switching transistor Q3 is switched on, so that the auxiliary winding Na, the auxiliary capacitor Ca, and the body diode Da constitute an energy storage loop, and the electric energy received by the auxiliary winding Na can be stored in the auxiliary capacitor Ca.

It can be understood that the diode Da may be alternatively an auxiliary diode connected in parallel to the auxiliary switching transistor Q3. When the diode Da is a parasitic diode in the auxiliary switching transistor Q3, a structure of the two-transistor flyback conversion circuit 011-1b can be simplified. When the diode Da is an auxiliary diode connected in parallel to the auxiliary switching transistor Q3, energy loss can be reduced during charging of the auxiliary capacitor Ca, thereby further improving conversion efficiency of the two-transistor flyback conversion circuit 011-1b.

As shown in FIG. 4, at a later stage (before a fourth time point t4 in FIG. 4) of discharging of the primary-side winding Np, electric energy in the primary-side winding Np is completely released, and in this case, the primary-side winding Np actually has stopped discharging. The auxiliary winding Na cannot continue to receive electric energy from the primary-side winding Np, and therefore a voltage of the auxiliary winding Na starts to gradually decrease.

At the fourth time point t4 later than the third time point t3, the control circuit 011-2 may control the auxiliary circuit 213 to charge the auxiliary winding Na again. It can be understood that the fourth time point t4 may serve as an end time point of a current voltage conversion period, or may serve as an initial time point (t0) of a next voltage conversion period.

Figure 6:
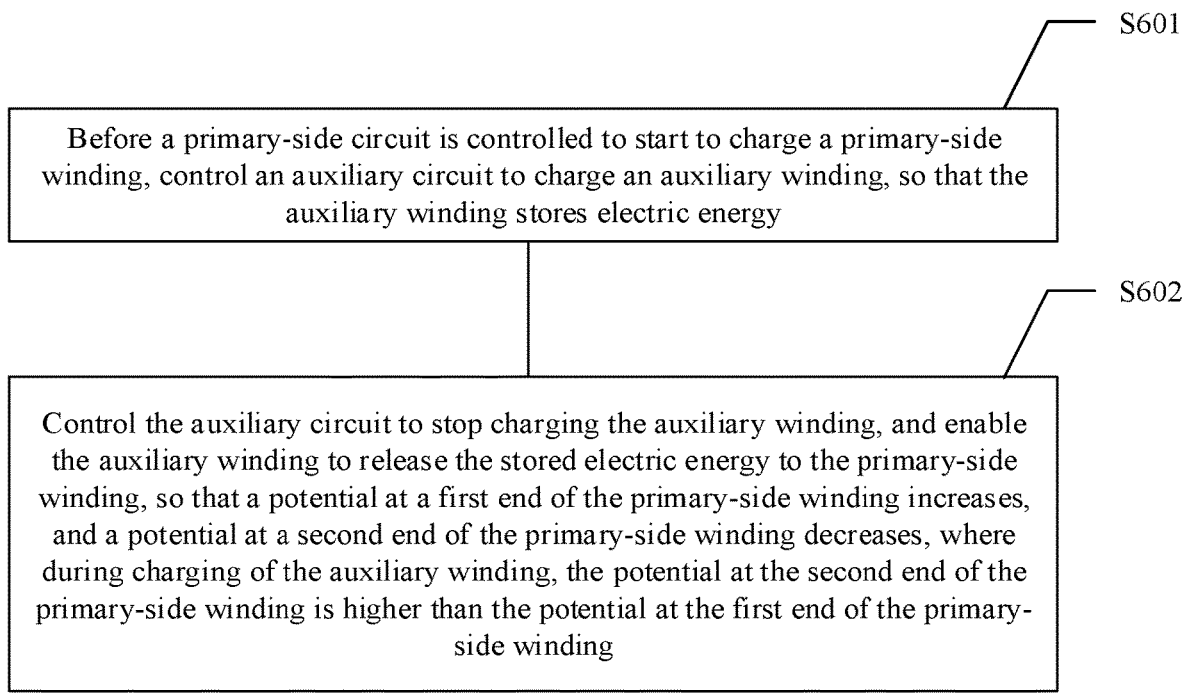
FIG. 6 is a schematic flowchart of a control method according to an embodiment of this application.

Based on a same technical concept, an embodiment of this application further provides a control method. The method may be used to control any two-transistor flyback conversion circuit provided in embodiments of this application. For example, the control method may be applied to the control circuit 011-2 in FIG. 3, and may control the two-transistor flyback conversion circuit 011-1b to operate. The control method provided in this embodiment of this application mainly includes the following steps shown in FIG. 6.

S601: Before a primary-side circuit is controlled to charge a primary-side winding, control an auxiliary circuit to charge an auxiliary winding, so that the auxiliary winding stores electric energy.

S602: Control the auxiliary circuit to stop charging the auxiliary winding, and enable the auxiliary winding to release the stored electric energy to the primary-side winding, so that a potential at a first end of the primary-side winding increases, and a potential at a second end of the primary-side winding decreases, where during charging of the auxiliary winding, the potential at the second end of the primary-side winding is higher than the potential at the first end of the primary-side winding.

First duration in which the auxiliary circuit is controlled to charge the auxiliary winding is positively related to an input voltage and an output voltage of the two-transistor flyback conversion circuit. In a possible implementation, before the auxiliary circuit is controlled to charge the auxiliary winding, the first duration may be further determined based on the input voltage and the output voltage of the two-transistor flyback conversion circuit. In various embodiments, a length of the first duration may be dynamically adjusted based on the input voltage and the output voltage. In another possible implementation, the first duration may be alternatively a specified time length.

For example, the auxiliary circuit may include the auxiliary winding, an auxiliary capacitor, and an auxiliary switching transistor, one end of the auxiliary capacitor is connected to a first end of the auxiliary winding, the other end of the auxiliary capacitor is connected to a second electrode of the auxiliary switching transistor, a first electrode of the auxiliary switching transistor is connected to a second end of the auxiliary winding, and a control electrode of the auxiliary switching transistor is connected to the control circuit. In this structure, when the auxiliary circuit is controlled to charge the auxiliary winding, the auxiliary switching transistor may be switched on, so that the auxiliary capacitor can charge the auxiliary winding. When the auxiliary circuit stops charging the auxiliary winding, the auxiliary switching transistor may be switched off, so that the auxiliary capacitor stops charging the auxiliary winding, and the auxiliary winding discharges to the primary-side winding.

The auxiliary winding discharges to the primary-side winding, so that the potential at the first end of the primary-side winding can increase, and the potential at the second end can decrease. After soft switching can be implemented for a first diode and a second switching transistor, the primary-side circuit may be further controlled to charge the primary-side winding. For example, at a second time point later than a first time point, the primary-side circuit may be further controlled to charge the primary-side winding, where the first time point is a time point at which the auxiliary circuit is controlled to stop charging the auxiliary winding; and at a third time point later than the second time point, the primary-side circuit may be further controlled to stop charging the primary-side winding, and the primary-side winding is enabled to discharge to a secondary-side winding and the auxiliary winding.

During a period from the first time point to the second time point, the auxiliary winding may discharge to the primary-side winding, to reduce a voltage between a first electrode and a second electrode of each of a first switching transistor (for example, the switching transistor Q1 in FIG. 3) and the second switching transistor (for example, the switching transistor Q2 in FIG. 3) in the primary-side circuit. In this way, at the second time point, when the primary-side circuit is controlled to charge the primary-side winding, soft switching can be implemented for the first switching transistor and the second switching transistor.

For example, the primary-side circuit may include the primary-side winding, the first switching transistor, the second switching transistor, a first diode, a second diode, and an input capacitor. A first electrode of the first switching transistor is connected to one end of the input capacitor and a cathode of the first diode, the first electrode of the first switching transistor may receive the input voltage, a second electrode of the first switching transistor is connected to a cathode of the second diode and the first end of the primary-side winding, the second end of the primary-side winding is connected to an anode of the first diode and a first electrode of the second switching transistor, a second electrode of the second switching transistor is connected to an anode of the second diode, the second electrode of the second switching transistor is equipotentially connected to the other end of the input capacitor, and the control circuit is connected to a control electrode of the first switching transistor and a control electrode of the second switching transistor. In this structure, the first switching transistor and the second switching transistor may be switched on at the second time point, to control the primary-side circuit to charge the primary-side winding by using the input voltage. In addition, the first switching transistor and the second switching transistor may be further switched off at the third time point, to control the primary-side circuit to stop charging the primary-side winding, and enable the primary-side winding to discharge to the secondary-side winding and the auxiliary winding.

In this embodiment of this application, a voltage between the first electrode and the second electrode of the first switching transistor is a first voltage, and a voltage between the first electrode and the second electrode of the second switching transistor is a second voltage. Usually, the second time point is not earlier than a time point at which neither a voltage value of the first voltage nor a voltage value of the second voltage is greater than a voltage threshold.

In this embodiment of this application, there are a plurality of possible implementations of determining the second time point. For example, the first voltage between the first electrode and the second electrode of the first switching transistor in the primary-side circuit and the second voltage between the first electrode and the second electrode of the second switching transistor in the primary-side circuit may be detected, where the second electrode of the first switching transistor is connected to the first end of the primary-side winding, and the first electrode of the second switching transistor is connected to the second end of the primary-side winding; and the second time point is determined based on the first voltage and the second voltage.

For another example, an interval between the second time point and the first time point is second duration, and the second duration is a specified time length. Therefore, the second time point may be determined based on the second duration and the first time point.

Clearly, a person skilled in the art can make various modifications and variations to this application without departing from the spirit and scope of this application. In this way, this application is intended to cover these modifications and variations of this application provided that they fall within the scope of the claims of this application and equivalent technologies thereof.

What is claimed is:

1. A two-transistor flyback conversion circuit, comprising:
   a primary-side circuit comprising a primary-side winding;
   a secondary-side circuit comprising a secondary-side winding; and
   an auxiliary circuit comprising an auxiliary winding,
   wherein the primary-side winding, the secondary-side winding, and the auxiliary winding are coupled to each other, and
   wherein before the primary-side circuit starts to charge the primary-side winding, the auxiliary circuit is configured to:
   charge the auxiliary winding to store electric energy;
   stop charging the auxiliary winding; and
   enable the auxiliary winding to release the stored electric energy to the primary-side winding such that a potential at a first end of the primary-side winding increases and a potential at a second end of the primary-side winding decreases,
   wherein during charging of the auxiliary winding, the potential at the second end of the primary-side winding is higher than the potential at the first end of the primary-side winding.

2. The two-transistor flyback conversion circuit of claim 1, wherein the auxiliary circuit further comprises:
   an auxiliary switching transistor having a first electrode and a second electrode; and
   an auxiliary capacitor comprising:
   a first auxiliary capacitor end coupled to a first end of the auxiliary winding; and
   a second auxiliary capacitor end coupled to the second electrode of the auxiliary switching transistor,
   wherein the first electrode of the auxiliary switching transistor is coupled to a second end of the auxiliary winding, and
   wherein the auxiliary switching transistor is configured to:
   after being switched on, enable the auxiliary capacitor to charge the auxiliary winding; and
   after being switched off, enable the auxiliary capacitor to stop charging the auxiliary winding, and enable the auxiliary winding to discharge to the primary-side winding.

3. The two-transistor flyback conversion circuit of claim 2, wherein the auxiliary winding is further configured to receive, when the primary-side winding discharges, electric energy released by the primary-side winding, and wherein the auxiliary capacitor is further configured to store, when the primary-side winding discharges, the electric energy received by the auxiliary winding.

4. The two-transistor flyback conversion circuit of claim 2, wherein the auxiliary switching transistor comprises a body diode, wherein an anode of the body diode is coupled to the second auxiliary capacitor end, and wherein a cathode of the body diode is coupled to the second end of the auxiliary winding.

5. The two-transistor flyback conversion circuit of claim 1, wherein the primary-side circuit further comprises:

a second switching transistor comprising a fifth electrode and a sixth electrode;
a first diode comprising a first diode anode and a first diode cathode;
a second diode comprising a second diode anode and a second diode cathode;
an input capacitor having a first end and a second end; and
a first switching transistor comprising:
  a third electrode coupled to the first end of the input capacitor and the first diode cathode, wherein the third electrode is configured to receive an input voltage; and
  a fourth electrode coupled to the second diode cathode and the first end of the primary-side winding, wherein the second end of the primary-side winding is coupled to the first diode anode and the fifth electrode,
wherein the sixth electrode is coupled to the second diode anode,
wherein the sixth electrode is equipotentially coupled to the second end of the input capacitor,
wherein the first switching transistor and the second switching transistor are both configured to be switched on when the primary-side winding is charged and be switched off when the primary-side winding discharges,
wherein the primary-side winding is configured to be charged by using the input voltage when the first switching transistor and the second switching transistor are switched on and discharge to the auxiliary winding and the secondary-side winding when the first switching transistor and the second switching transistor are switched off,
wherein the first diode and the second diode are both configured to be cut off when the primary-side winding is charged and be switched on when the primary-side winding discharges, and
wherein the input capacitor is configured to store leakage inductance energy in the primary-side winding when the primary-side winding discharges.

6. The two-transistor flyback conversion circuit of claim 5, wherein the auxiliary circuit is further configured to discharge to the primary-side winding through the auxiliary winding such that the potential at the first end of the primary-side winding increases to a potential at the third electrode of the first switching transistor and the potential at the second end of the primary-side winding decreases to a potential at the sixth electrode of the second switching transistor.

7. The two-transistor flyback conversion circuit of claim 1, wherein the secondary-side circuit further comprises:
an output capacitor having a first end and a second end; and
a secondary-side diode having a secondary-side anode and a secondary-side cathode,
wherein a first end of the secondary-side winding is coupled to the first end of the output capacitor,
wherein the first end of the secondary-side winding is configured to output an output voltage,
wherein a second end of the secondary-side winding is coupled to the secondary-side cathode,
wherein the secondary-side anode is coupled to the second end of the output capacitor,
wherein the second end of the output capacitor is configured to be grounded,
wherein the secondary-side winding is configured to receive, when the primary-side winding discharges, electric energy released by the primary-side winding,
wherein the secondary-side diode is configured to;
  be cut off when the primary-side winding is charged; and
  be switched on when the primary-side winding discharges, and
wherein the output capacitor is configured to filter the output voltage.

8. A power module, comprising:
a two-transistor flyback conversion circuit comprising:
  a primary-side circuit comprising a primary-side winding;
  a secondary-side circuit comprising a secondary-side winding;
  an auxiliary circuit comprising an auxiliary winding, wherein the primary-side winding, the secondary-side winding, and the auxiliary winding are coupled to each other; and
a control circuit is configured to:
  control, before controlling the primary-side circuit to charge the primary-side winding, control the auxiliary circuit to charge the auxiliary winding to store electric energy; and
  control the auxiliary circuit to stop charging the auxiliary winding and enable the auxiliary circuit to release the stored electric energy to the primary-side winding such that a potential at a first end of the primary-side winding increases and a potential at a second end of the primary-side winding decreases,
  wherein during charging of the auxiliary winding, the potential at the second end of the primary-side winding is higher than the potential at the first end of the primary-side winding.

9. The power module of claim 8, wherein the control circuit is further configured to determine, based on an input voltage and an output voltage of the two-transistor flyback conversion circuit, a first duration in which the auxiliary circuit is controlled to charge the auxiliary winding, and wherein the first duration is positively related to the input voltage and the output voltage of the two-transistor flyback conversion circuit.

10. The power module of claim 9, wherein the first duration in which the auxiliary circuit charges the auxiliary winding is a specified time length.

11. The power module of claim 8, wherein the auxiliary circuit further comprises:
an auxiliary switching transistor comprising a first electrode, a second electrode, and a control electrode; and
an auxiliary capacitor comprising:
  a first auxiliary capacitor end coupled to a first end of the auxiliary winding; and
  a second auxiliary capacitor end coupled to the second electrode of the auxiliary switching transistor,
wherein the first electrode of the auxiliary switching transistor is coupled to a second end of the auxiliary winding,
wherein the control electrode of the auxiliary switching transistor is coupled to the control circuit, and
wherein the control circuit is further configured to:
  switch on the auxiliary switching transistor such that the auxiliary capacitor charges the auxiliary winding; and switch off the auxiliary switching transistor such that the auxiliary capacitor stops charging the auxiliary winding and the auxiliary winding discharges to the primary-side winding.

12. The power module of claim 8, wherein the control circuit is further configured to:
control, at a second time point later than a first time point, the primary-side circuit to charge the primary-side winding, wherein the first time point is a time point at which the auxiliary circuit is controlled to stop charging the auxiliary winding; and
control, at a third time point later than the second time point, the primary-side circuit to stop charging the primary-side winding.

13. The power module of claim 12, wherein the primary-side circuit further comprises:
a second switching transistor comprising a fifth electrode and a sixth electrode;
a first diode comprising a first diode anode and a first diode cathode;
a second diode comprising a second diode anode and a second diode cathode;
an input capacitor having a first end and a second end; and
a first switching transistor comprising:
a third electrode coupled to the first end of the input capacitor and the first diode cathode, wherein the third electrode is configured to receive an input voltage; and
a fourth electrode coupled to the second diode cathode and the first end of the primary-side winding, wherein the second end of the primary-side winding is coupled to the first diode anode and the fifth electrode,
wherein the sixth electrode is coupled to the second diode anode,
wherein the sixth electrode is equipotentially coupled to the second end of the input capacitor,
wherein the control circuit is coupled to a first control electrode of the first switching transistor and a second control electrode of the second switching transistor, and
wherein the control circuit is further configured to:
switch on the first switching transistor and the second switching transistor at the second time point such that the primary-side circuit charges the primary-side winding using the input voltage; and
switch off the first switching transistor and the second switching transistor at the third time point such that the primary-side circuit stops charging the primary-side winding and the primary-side winding discharges to the secondary-side winding and the auxiliary winding.

14. The power module of claim 13, wherein a voltage between the third electrode and the fourth electrode is a first voltage, wherein a voltage between the first-fifth electrode and the sixth electrode is a second voltage, and wherein the second time point is not earlier than a time point at which neither a voltage value of the first voltage nor a voltage value of the second voltage is greater than a voltage threshold.

15. The power module of claim 14, wherein the control circuit is coupled to the third electrode, the fourth electrode, the fifth electrode, and the sixth electrode, and wherein the control circuit is further configured to:
detect the first voltage between the third electrode and the fourth electrode;
detect the second voltage between the fifth electrode and the sixth electrode; and
determine the second time point based on the first voltage and the second voltage.

16. The power module of claim 12, wherein an interval between the second time point and the first time point is a second duration, and wherein the second duration is a specified time length.

17. A control method, comprising:
controlling, before controlling a primary-side circuit of a two-transistor flyback conversion circuit to charge a primary-side winding, an auxiliary circuit of the two-transistor flyback conversion circuit to charge an auxiliary winding such that the auxiliary winding stores electric energy;
controlling the auxiliary circuit to stop charging the auxiliary winding; and
enabling the auxiliary winding to release the stored electric energy to the primary-side winding such that a potential at a first end of the primary-side winding increases and a potential at a second end of the primary-side winding decreases,
wherein during charging of the auxiliary winding, the potential at the second end of the primary-side winding is higher than the potential at the first end of the primary-side winding.

18. The control method of claim 17, wherein before controlling the auxiliary circuit to charge the auxiliary winding, the control method further comprises determining, based on an input voltage and an output voltage of the two-transistor flyback conversion circuit, a first duration in which the auxiliary circuit is controlled to charge the auxiliary winding, wherein the first duration is positively related to the input voltage and the output voltage of the two-transistor flyback conversion circuit.

19. The control method of claim 18, wherein the first duration in which the auxiliary circuit charges the auxiliary winding is a specified time length.

20. The control method of claim 17, further comprising:
controlling, at a second time point later than a first time point, the primary-side circuit to charge the primary-side winding, wherein the first time point is a time point at which the auxiliary circuit is controlled to stop charging the auxiliary winding; and
controlling, at a third time point later than the second time point, the primary-side circuit to stop charging the primary-side winding.

* * * * *

UNITED STATES PATENT AND TRADEMARK OFFICE
CERTIFICATE OF CORRECTION

PATENT NO. : 12,316,230 B2
APPLICATION NO. : 18/160455
DATED : May 27, 2025
INVENTOR(S) : Xue Zhang and Jie Ren Page 1 of 1

It is certified that error appears in the above-identified patent and that said Letters Patent is hereby corrected as shown below:

In the Claims

Claim 8, Column 26, Line 24: "winding, control the" should read "winding, the"

Claim 14, Column 27, Line 54: "the first-fifth electrode" should read "the fifth electrode"

Signed and Sealed this
Fifteenth Day of July, 2025

Coke Morgan Stewart
*Acting Director of the United States Patent and Trademark Office*